United States Patent [19]

Neuhaus

[11] Patent Number: 5,209,570
[45] Date of Patent: May 11, 1993

[54] DEVICE FOR MEASURING THE RADIATION TEMPERATURE OF A MELT IN VACUUM

[75] Inventor: Dietmar Neuhaus, Duesseldorf, Fed. Rep. of Germany

[73] Assignee: Raumfahrt e.V. Deutsche Forschungsanstalt fur Luft- und, Cologne, Fed. Rep. of Germany

[21] Appl. No.: 870,474

[22] Filed: Apr. 17, 1992

Related U.S. Application Data

[62] Division of Ser. No. 529,969, May 29, 1990, Pat. No. 5,106,201.

[30] Foreign Application Priority Data

May 30, 1989 [DE] Fed. Rep. of Germany ....... 3917504
Mar. 15, 1990 [DE] Fed. Rep. of Germany ....... 4008327

[51] Int. Cl.$^5$ .................................................. G01J 5/06
[52] U.S. Cl. ..................................... 374/131; 374/139; 356/43
[58] Field of Search ............... 374/120, 121, 130, 131, 374/139; 266/87, 99, 903; 250/342, 347, 353; 356/43

[56] References Cited

U.S. PATENT DOCUMENTS

| | | | |
|---|---|---|---|
| 2,634,609 | 4/1953 | Obermaier | 374/121 |
| 3,094,623 | 6/1963 | Weiss | 250/353 |
| 4,421,985 | 12/1983 | Billingsley et al. | 250/353 |
| 4,448,547 | 5/1984 | Wickersheim | 374/121 |
| 4,521,068 | 6/1985 | Schulte in den Bäumen | 250/353 |
| 4,716,294 | 12/1987 | Pettke et al. | 250/342 |
| 4,772,797 | 9/1988 | Kahl et al. | 250/353 |
| 4,913,046 | 4/1990 | Möthrath et al. | 374/121 |
| 5,076,707 | 12/1991 | Neuhaus | 374/139 |
| 5,106,201 | 4/1992 | Neuhaus | 374/139 |

Primary Examiner—William A. Cuchlinski, Jr.
Assistant Examiner—G. Bradley Bennett
Attorney, Agent, or Firm—Spensley Horn Jubas & Lubitz

[57] ABSTRACT

It is a problem of pyrometric temperature measuring of melts in a vacuum that the material of the melt will be deposited on mirrors, windows and other optical devices so that the radiation will be screened more and more effectively, the closer it comes to the pyrometer. In order to avoid vapor desposition in the path of radiation, a grating arrangement is provided between the melt and the pyrometer, which focusses the incoming radiation and concentrates it onto the pyrometer. The grating arrangement is partly permeable to the molecules of the melt material. The direct path between the melt and the pyrometer is blocked by a screen. In this way, vapor deposition on the window prefixed to the pyrometer are avoided, while the radiation can reach the pyrometer.

7 Claims, 7 Drawing Sheets

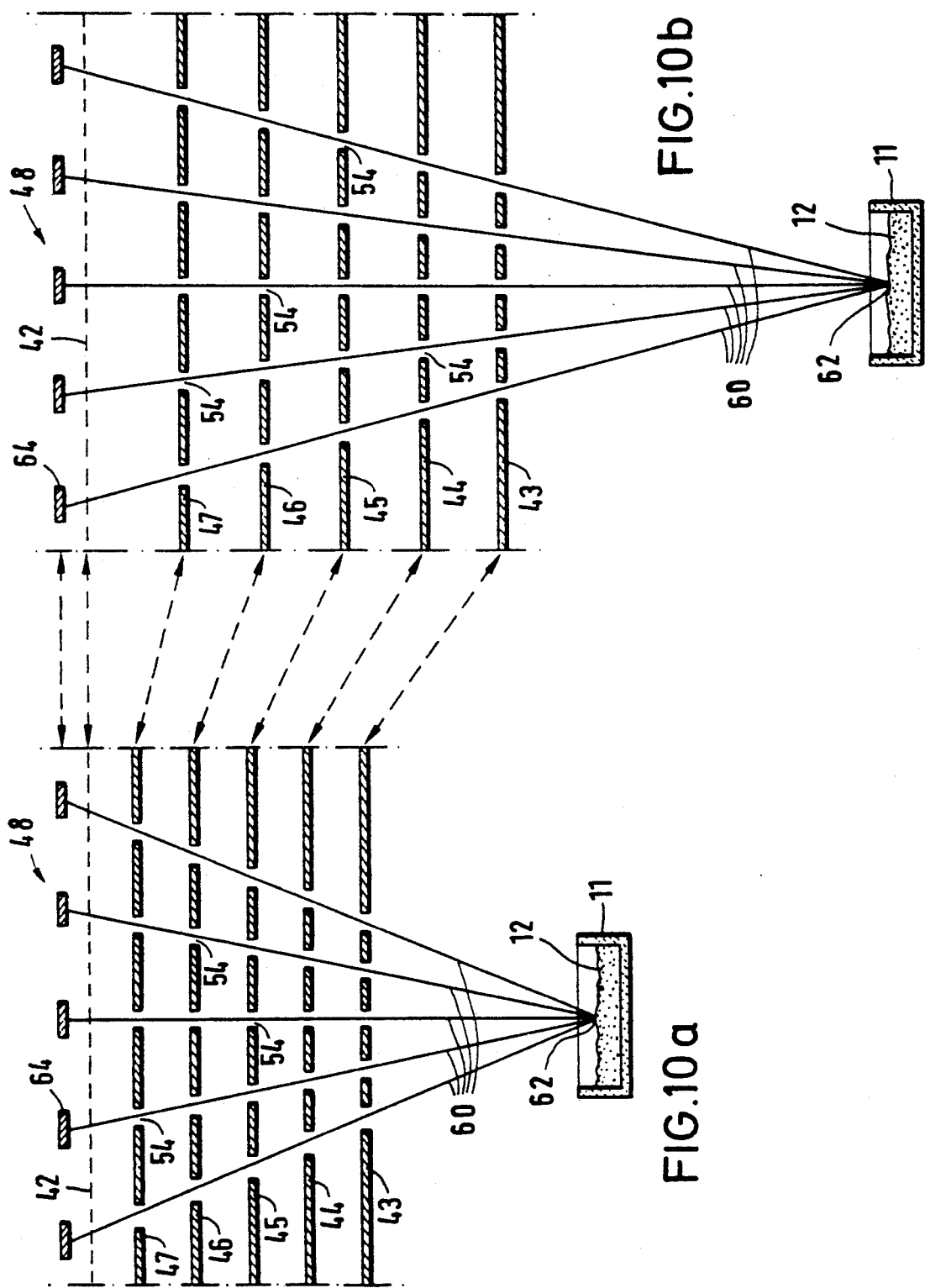

DEVICE FOR MEASURING THE RADIATION TEMPERATURE OF A MELT IN VACUUM

This is a division of application Ser. No. 07/529,969, filed on May 29, 1990 now U.S. Pat. No. 5,106,201.

BACKGROUND OF THE INVENTION

1. Field of the Invention

The present invention relates to a device for measuring the radiation temperature of a melt in vacuum, which uses a pyrometer.

2. Description of Related Art

In measuring the temperature of molten samples, in particular of metals, in a vacuum, there is a problem that sample material in a vapor state will be deposited on the wall of the vacuum chamber or the window of the pyrometer. In this case, the member, initially permeable to the radiation, will quickly become impermeable to the radiation because of the evaporation, and will be unfit for further pyrometric use.

From Japanese Patent 60-57224 A, in: Patents Abstract of Japan, Vol. 9 (1985), No. 186 (117 P 377), a device for measuring the radiation temperature of a melt in vacuum is known wherein the radiation thermometer is shielded against vaporous matter by a perforated screen with a central passage. The shielding cannot be complete, since the pyrometer is still orientated directly towards the melt and, thus, is still evaporated. Moreover, only a comparatively small amount of the radiation emitted by the melt reaches the pyrometer, due to the shielding, so that the temperature measurement is rather inexact.

It is an object of the invention to provide a device of the type mentioned above, wherein the present pyrometer is reliably protected against an evaporation by the melt material, although a comparatively large amount of the radiation is measured.

SUMMARY OF THE INVENTION

In a first variant of the device of the present invention, an optical grating arrangement is provided between the melt and the pyrometer, which concentrates the radiation coming from the melt onto the pyrometer, whereas the direct path between the melt and the pyrometer, or between the melt and a window disposed before the pyrometer, is blocked. Thus, vapor molecules that escape from the melt at high velocities are kept from getting to the pyrometer or the window arranged before the same on a straight path and from being deposited there. A part of the electromagnetic radiation (heat and light radiation) is deflected by the disperging effect of the optical grating arrangement for radiation focussing. Usually, a pyrometer operates at wavelengths in the magnitude of 1 $\mu$m to about 3 $\mu$m. In this case, a grating constant of the optical grating of 50 $\mu$m will suffice to achieve a sufficient radiation deflection. For the heat radiation, the grating arrangement has the same effect that an optical diffraction grating has for light radiation, whereas, for the molecules of the melt material, the grating arrangement is like a simple grating that absorbs a part of the impinging molecules and lets the other part pass linearly.

Advantageously, the melt, the grating arrangement and the pyrometer are arranged along a straight axis on which a shielding screen is disposed behind the grating arrangement, seen in the direction of the radiation, the radial extension of the screen being smaller than that of the grating arrangement. It is the purpose of the shielding screen to keep the main flow of vapor from the pyrometer.

In an advantageous embodiment of the invention, the grating arrangement is designed such that it deflects the impinging radiation from the optical axis. Such a grating arrangement is particularly suited for two-color pyrometric temperature measurements, wherein pyrometers are provided in an arrangement depending on the deflection of the radiation which depends on the respective wavelengths, on which radiation of different wavelengths impinges. In a grating arrangement that deflects the impinging radiation from the optical axis, the vapor will pass through the grating along the optical axis, whereby the vapor and the radiation used in measuring the temperature are separated behind the grating.

The grating arrangement may be formed of any kind of grating in which the spaces between the grating lines are open and permeable to matter. For instance, a grating of parallel thin wires or a cross grating of thin crossing grating rods may be used. Preferably, a zone plate of numerous rings arranged in one plane is used, because zone plates have image-reproducing properties.

According to a second variant, a grating arrangement that is partly permeable to matter is disposed between the melt and the pyrometer, in front of which a direction-selective device is arranged in the path of the radiation. Radiation from that portion of the melt, onto which the direction-selective device is directed, will reach the grating arrangement via the direction-selective device. The grating arrangement may be the zone plate described above, having image-reproducing properties and, depending on its configuration, effecting a deflection of radiation, whereby the radiation and the flow of vaporous melt material are separated. Advantageously, a non-reproductive diffraction grating is used as the grating arrangement; in this case, the radiation diffracted at the diffraction grating is employed for the temperature measuring.

In an advantageous embodiment of the second variant of the present invention, the direction-selective device consists of a bundle of parallel tubes, the interiors of which are preferably provided such that they absorb light, e.g. by means of a suited coating, in order to avoid reflections of light. This is necessary, because light reflections at the inner walls of the tubes can interfere with pyrometric temperature measuring, since reflections can be wavelength-selective so that the radiation reaching the pyrometer does not have the spectral range of the radiation emitted by the melt. Reflections within the tubes or the channels of the direction-selective device should also be avoided because the reflection properties may vary in dependence on the amount of material deposited, for which reason the accuracy of measurement changes with an increasing operation time.

Advantageously, the direction-selective device consists of a plurality of perforated screens, diaphragms, blinds or the like arranged behind one another in the path of radiation, each having at least one hole. The relative position of the individual perforated screens is selected such that all holes or groups of holes of the perforated screens are in flush. Depending on the number of holes in each screen, the perforated screens provide "passages" between the melt and the grating arrangement. Between the individual perforated screens, the passages are open at the sides. No light reflections can occur in these laterally open passage areas; on the other hand, no scattered light can enter the passages at the open areas, either. Furthermore, the production of perforated screens by etching the holes into a film of material is rather simple. Advantageously, the screens consist of a lightabsorbing material.

Preferably, a shielding screen with a hole is disposed between the grating arrangement and the pyrometer, the portions of the screen that are impermeable to radiation being arranged in a linear projection of the aligned holes of the perforated screens, i.e. in a linear projection of the channels or tubes of the direction-selective device. The shielding screen intercepts vapor particles after these have passed the channels or the perforated screens and the diffraction grating. In this way, the successively arranged pyrometer is even more reliably protected from vaporous melt material. If the temperature measuring uses the light diffracted at the non-reproductive diffraction grating, the subsequent pyrometer may be arranged such that it is not evaporated. If a diffraction grating is used as the grating arrangement, the optical system of the pyrometer should be designed such that it reproduces the plane of the diffraction grating on the detectors of the pyrometer. Since a non-reproductive diffraction grating, other than e.g. a reproductive diffraction grating (zone plate), does not concentrate radiation in one direction, like e.g. an optical lens, it is the purpose of the optical system of the pyrometer to concentrate the radiation (on the light detectors). The light may also be concentrated by means of optical fibres or a mirror optic on which the diffracted light impinges and which transmit it to the light detectors. The optical fibres are a low-cost solution to the problem of the focussing and the concentration of radiation towards detectors of the pyrometer.

Advantageously, the holes in the perforated screens are concentric slits of narrow width. The configuration and arrangement of the curved slits allows to select the range of the sample surface to be examined, the radiation of which range is allowed to pass to the diffraction grating. The slits may be concentric annular apertures extending over 360° and being interrupted by radial ridges provided for mechanical stability and for holding together the also annular opaque regions of the perforated screens.

In order that a large quantity of light reaches the pyrometer, it is necessary to generate "many light beam edges". In other words: a plurality of "radiation beams" should impinge on the diffraction grating, which is obtained by providing a corresponding number of holes per perforated screen and/or by designing the holes as concentric annular slit openings.

The radial distance of the concentric slits increases advantageously with an increasing proximity of the perforated screens to the diffraction grating. Accordingly, the concentric slits of the perforated screen farthest from the diffraction grating, i.e. the first screen to the melt, have a lesser radial distance than the concentric slits of the perforated screen arranged immediately before the diffraction grating. Since the holes of different screens are in alignement, channels or passages are formed that resemble cone surfaces. By arranging a plurality of concentric annular slits of different distances to the center per screen, cone- surface-like passages of different diameters are formed, the tips of all cones coinciding in the observation point of the melt. The width of the annular slits determines the thickness of the passages. The configuration of the screen package described above allows to sense light coming from a limited portion (observation point) of the melt in a maximum solid (dihedral) angle.

Advantageously, the distances between neighbouring perforated screens, and between the last perforated screen and the shielding screen are displaceable by the same factor. Advantageously, this is accomplished by arranging the entire package of perforated screens in the path of radiation so as to be longitudinally displaceable. The displaceability of the screens and the simultaneous change in distance by the same factor allow an adjustment of the evaporation protection consisting of the grating arrangement, the direction-selective device and, possibly, the shielding screen, to different distances from the surface of the melt. A relative horizontal displacement of the perforated screens, i.e. a displacement rectangular to the optical axis, by amounts which each are proportional to the distance of the perforated screens from the shielding screen, advantageously permits a horizontal shifting of the observation point.

In order to minimize both the changes in the dimensions of the openings in the diffraction grating and the changes in the optical properties of the grating caused by the evaporation, it is feasible to have the vapor jet encounter the diffraction grating substantially vertically. This can also be achieved by a corresponding arrangement of the diffraction grating. It is a particularly advantageous arrangement to provide the diffraction grating as a spherical surface with the melt observation point as the center of the sphere. The individual perforated screens are advantageously also provided as sections of a spherical surface, the centers of all spheres also coinciding with the melt observation point.

In order to obtain a maximum condensation coefficient of the particles, the perforated screens, the grating arrangement and the shielding screen are cooled by a cooling device.

The device of the present invention may be implemented for the pyrometry of substances evaporating in vacuum, be they solid or liquid, for instance to measure the temperature of a melt or a substance sublimating in vacuum.

BRIEF DESCRIPTION OF THE DRAWINGS

The following is a detailed description of embodiments of the present invention with reference to the accompanying drawings.

The Figures show.

DESCRIPTION OF THE PREFERRED EMBODIMENTS

Figure 1:
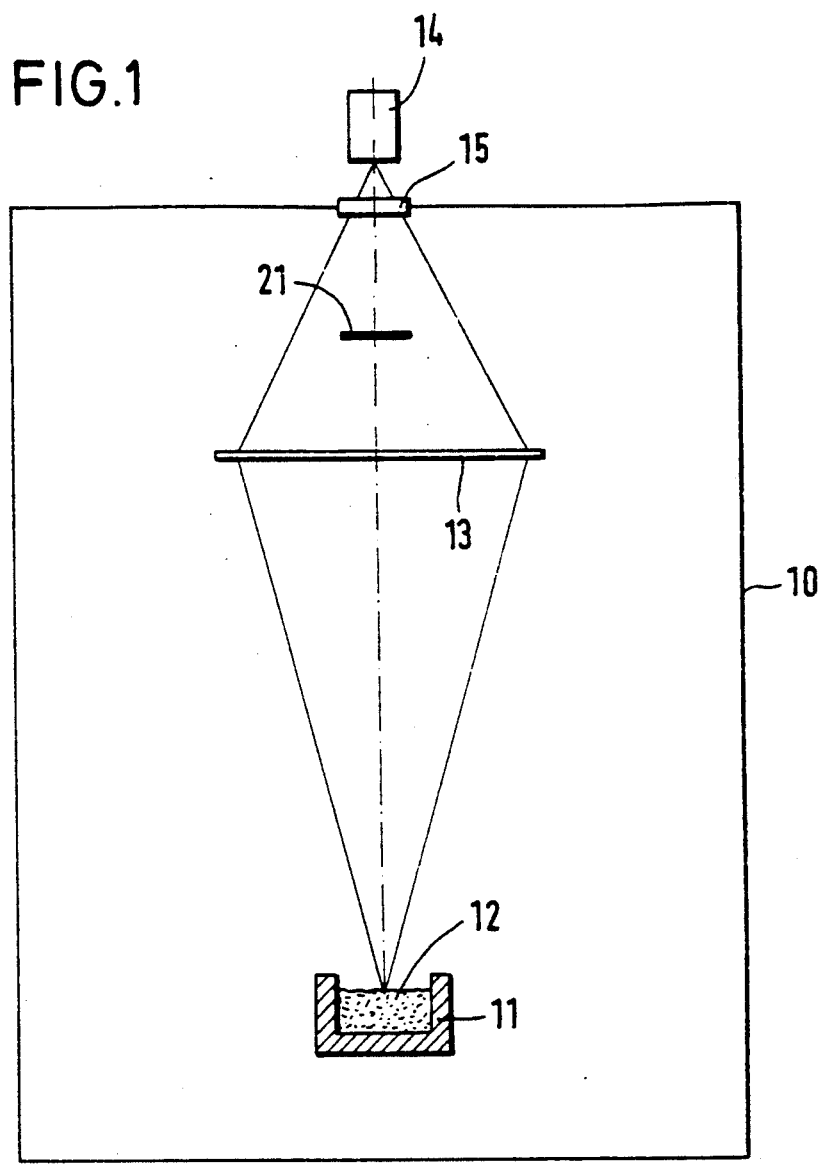
FIG. 1 a schematic illustration of a first embodiment of the device.

According to FIG. 1, a crucible 11 containing a melt 12 is disposed in a vacuum chamber 10. Above the melt 12, a grating arrangement 13 is mounted that functions as a diffraction grating for the radiation coming from the melt 12. The melt 12 is located on the optical axis of the grating arrangement 13. Behind the grating arrangement 13, the pyrometer 14 is arranged along the optical axis of the grating arrangement and outside the container 10. The container has a window 15 permeable to radiation, through which the radiation may get to the pyrometer 14.

Figure 2:
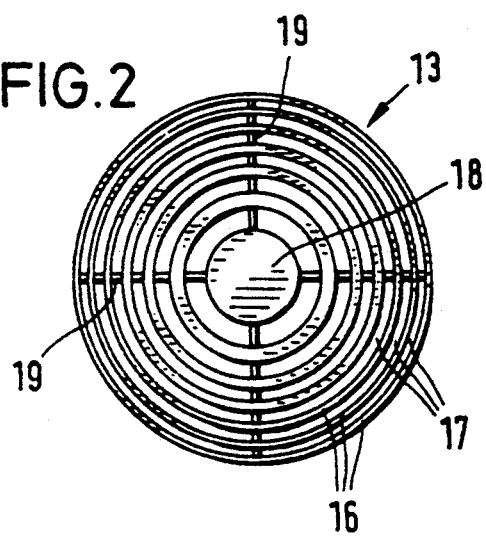
FIG. 2 a zone plate, the center of the zone plate being configured as a shielding screen, FIG. 3 another embodiment of the zone plate, FIG. 4 a second embodiment of the invention with a radiation deflecting grating arrangement, FIG. 5 a zone plate for use in the device of FIG. 4, FIG. 6 another zone plate as an alternative to that of FIG. 5, FIG. 7 a third embodiment with a tube bundle and a non-reproductive grating, FIG. 8 a further embodiment with perforated screens and a non-reproductive diffraction grating, FIG. 9 (*a–c*) a top plan view of two of the perforated screens and the shielding screen, used in the embodiment of FIG. 8, FIG. 10 a schematic illustration of the possibility to change the distance of the perforated screens to the melt, and FIG. 11 a schematic illustration of the possiblity to displace the perforated screens horizontally to obtain a displacement of the observation point on the melt surface.

The grating arrangement 13 of FIG. 2 consists of a zone plate having numerous concentric rings 16 that may consist of metal wire. Between the rings 16, annular concentric spaces 17 are provided, the dimensions of which are predetermined by the focal depth of the zone plate. The center of the zone plate has a centric impermeable shielding screen 18. The rings 16 and the shielding screen 18 are held together by radial rods 19. The number of rings and spaces is reduced in the drawings. In reality, more than 50 rings may be provided. The reproductive properties of the zone plate improve with an increasing number of rings.

The grating arrangement 13 has the same optical effect as a lens. It is disposed between the melt 12 and the pyrometer 14 such that it reproduces the melt 12 on the inlet of the pyrometer 14. The vapor molecules coming from the melt 12 pass the grating arrangement 13, as far as they are within the range of the spaces 17. If the molecules of the melt material meet with the rings 16, they will be deposited on the grating material. This depositing, however, does not change the grating substantially, since the distances between the rings can be changed by the deposits only to a negligeable extent. The shielding screen 18 is of such size that it shields the window 15 from the melt 12 completely. Thus, there is no straight path from the melt 12 to the window 15. Thus, a depositing of the melt material on the window 15 is prevented. Nevertheless, a great part of the radiation emitted from the melt material 12, collected and focussed by the grating arrangement 13, reaches the pyrometer 14.

Figure 3:
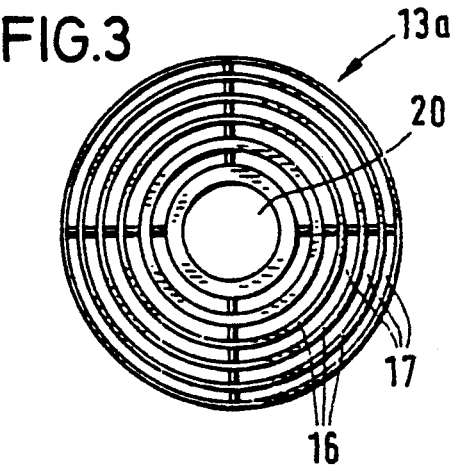

The grating arrangement 13a of FIG. 3 also is a zone plate of concentric rings 16 and spaces 17. However, a central aperture 20 is provided instead of the screen 18 of FIG. 2. A separate shielding screen 21 (FIG. 1), screening the direct path of the matter near the optical axis, is arranged in the path of radiation behind this grating arrangement and before the window 15. The shielding screen 21 is disposed a distance behind the grating arrangement 13.

Figure 4:
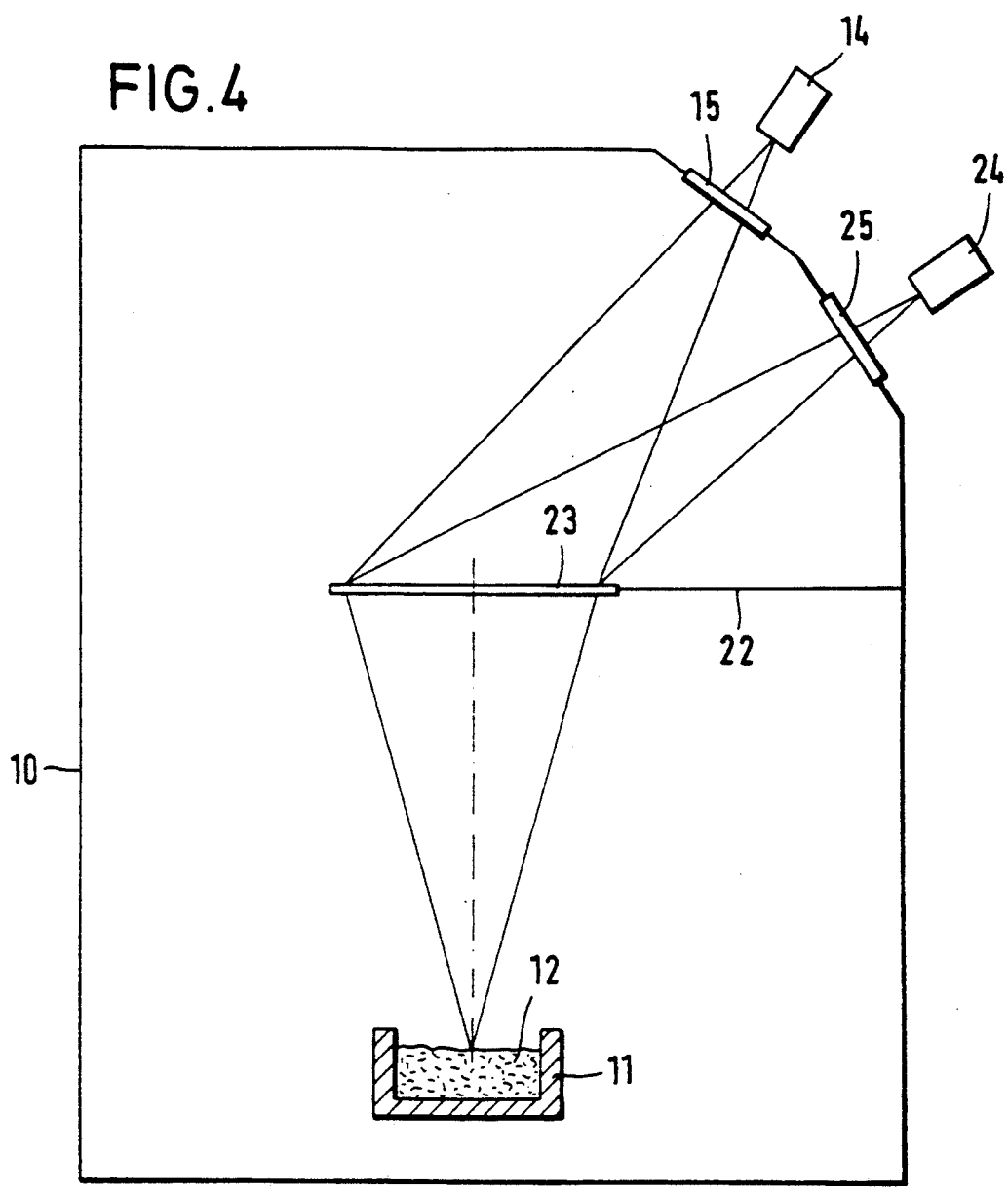

Whereas in the embodiment of FIG. 1 both the melt 12 and the pyrometer 14 are arranged along the same optical axis, FIG. 4 illustrates a grating arrangement 23 which deflects the impinging radiation to the side and concentrates it onto the pyrometer 14 through the window 15.

Figure 5:
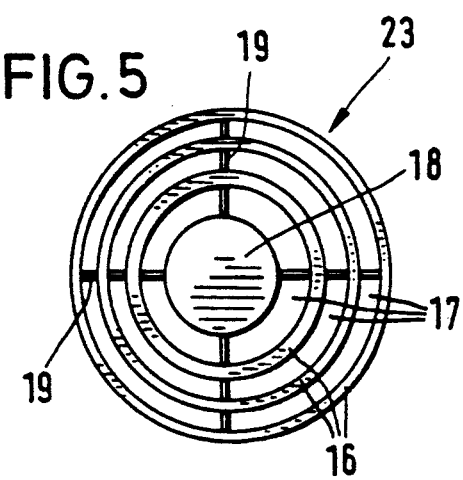

In this embodiment, too, the grating arrangement 23 consists of a zone plate. According to FIG. 5, the rings 16 and the screen 18 are not concentric. Rather, the centers of the rings 16 and the screen 18 lie on a common line and are mutually spaced. Such a zone plate may be referred to as a zone plate with an "off-axis" orientation. It causes the path of radiation illustrated in FIG. 4, wherein the optical axes of the radiation impinging on the grating arrangement 23 and of the radiation leaving the grating arrangement enclose an angle of less than 180°. Thus, the radiation is deflected by the diffraction grating, whereas the molecules of the melt material pass through the gaps in the grating linearly. The window 15 is provided at an inclined wall of the vacuum chamber 10 such that the radiation passes through the window 15 at right angles. An additional shielding wall 22 that may simultaneously be used as a retainer for the grating arrangement 23, prevents the existence of a straight direct path between the melt 12 and the window 15 so that no molecules of the melt material can get to the window 15 and be deposited there.

Figure 6:
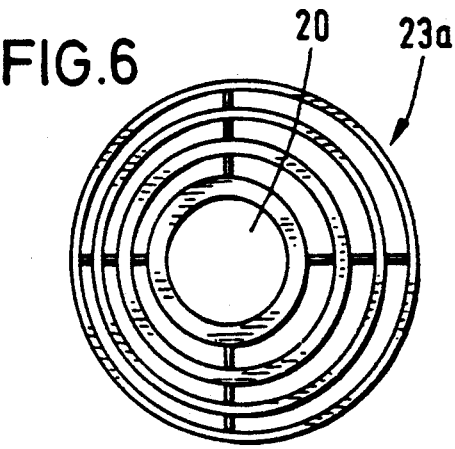

FIG. 6 illustrates another alternative of the grating arrangement 23 consisting of non-concentric rings, the central portion 20 being open. In this case, no additional shielding screen would be necessary behind the grating arrangement 23, since, according to the arrangement of FIG. 4, those molecules that pass the opening 20 cannot reach the window 15, anyway.

The device of FIG. 4 can be used for two-colour pyrometry, if an additional light sensor 24 with a corresponding window 25 is provided. The degree of deflection of the radiation by the grating arrangement depends on the wavelength. For example, the light sensor 24 is arranged such that it receives light of a longer wavelength than the light sensor 14. Together with evaluating electronics, the light sensors 14 and 24 form a two-colour pyrometer.

Instead of the zone plates illustrated, a simple ruled grating with straight parallel grating lines may be used. Since such a ruled grating possesses no reproductive properties, a tube bundle should preferably be affixed thereto, as a result of only radition impinging from a certain direction will reach the grating.

The invention is based on the application of optical transmission diffraction gratings, the diffraction gratings consisting of suitably broken materials that are pemeable to particle beams, i.e. molecules of the melt material. The diffraction grating deflects light in different directions, according to the individual orders of diffraction. The direction of the zero order diffraction is that of the impinging light. The zero order diffraction cannot be used in pyrometry, since the particles also travel on this path of radiation.

There is a distinction between reproductive and non-reproductive diffraction gratings. Reproductive diffraction gratings are, e.g., zone plates. Zone plates have the effect of optical lenses. Non-reproductive diffraction gratings require a different way of collimating the light for pyrometry so that light will impinge on the pyrometer only from a certain direction, thus allowing to focus on a melt for example. To achieve this, a tube bundle may be provided that is arranged between the melt and the diffraction grating. Behind the diffraction grating, as many orders of diffraction as possible should be used for pyrometry, so as to dispose of a sufficient radiation intensity. The zero diffraction order is of course excepted hereof.

Figure 7:
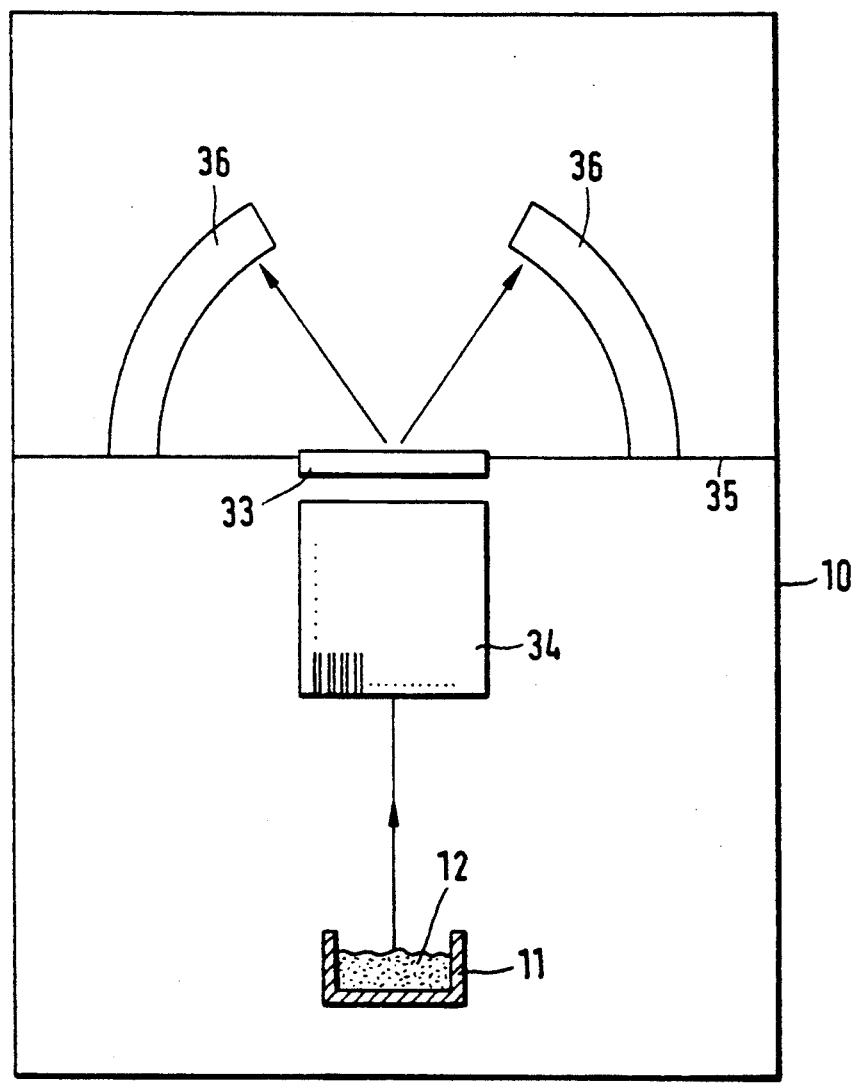
Figure 8:
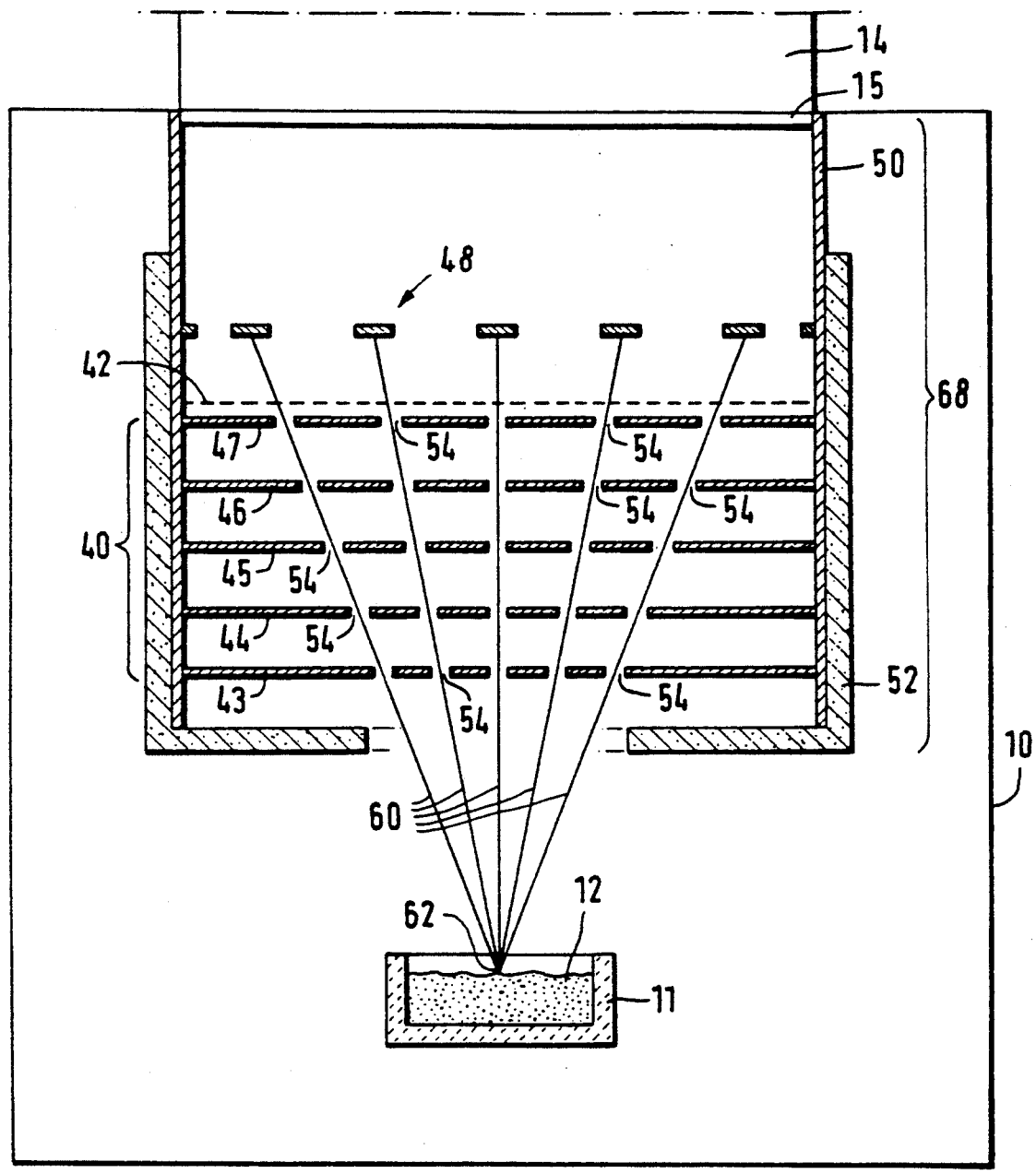

FIG. 7 shows an embodiment using a grating arrangement 33 with a non-reproductive diffraction grating. This diffraction grating may be a grating of parallel lines or a grating of two groups of crossing grating bars.

In order to obtain the necessary directional selectivity, a tube bundle 34 of numerous parallel tubes is arranged between the melt 12 and the grating arrangement 33, which tubes are orientated with the direction of the radiation to be selected. It is the effect of the tube bundle 34 that radiation coming exclusively from the desired covered range will impinge on the grating arrangement 33. This grating arrangement 33 is mounted in an opening of a shielding wall 35 of the container 10. Above the wall 35, two light sensors 36 are arranged laterally of the central axis of the grating arrangement 33 and are of sector-shaped configuration, if a grating of parallel rods is used. The number of the light sensors 36 preferably should be adapted to the diffraction pattern of the grating used. In the case of a grating consisting of two groups of crossing grating bars, it is feasible to provide four light sensors 36 in opposing pairs. Molecules linearly passing the tube bundle 34 and the grating arrangement 33, will pass between the light sensors 36, whereas the radiation is deflected by the grating arrangement 33 onto the light sensors 36 arranged on the sides.

FIGS. 8 to 11 illustrate a further embodiment of the device for pyrometric radiation temperature measuring. As in the embodiment of FIG. 7, a direction-selective device 40 and a non-reproductive diffraction grating 42 is used. The direction-selective device 40 consists of five perforated screens (blinds, diaphragms) 43 to 47 successively arranged in the path of radiation and located between the melt 12 and the diffraction grating 42. A shielding screen 48 is disposed between the diffraction grating 42 and the pyrometer 14, which itself, or the optic of which, :s only schematically represented in FIG. 8. The perforated screens 43 to 47, the diffraction grating 42 and the shielding screen 48 are retained by a retaining body 50 enclosing the window 15 in the container 10. The retaining body 50, open towards the melt 12, is exteriorly surrounded by a cooling jacket 52 which, at the edge thereof, partly covers the opening of the retaining body facing the melt 12.

Figure 9A:
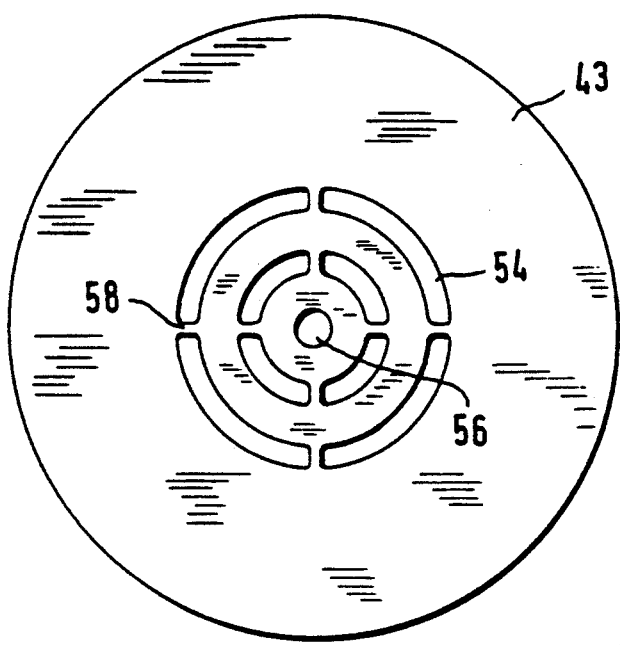

The five perforated screens 43 to 47, spaced equidistantly apart, each have a plurality of concentric slit-like annular openings 54 (see also FIGS. 9(a) and (b)). Further, the round perforated screens 43 to 47 each have a round passage hole 56 in the area of their centers. Each respective perforated screen is provided with a plurality of annular openings 54 arranged in concentric rings around the center, the rings extending over almost 360° and each circle being subdivided by radial ridges 58 into four slit-shaped openings 54 of the same size. The diameter of the concentric annular slits of the first perforated screen 43 closest to the melt 12 is smallest; the diameter of the concentric annular slits of the respective perforated screens increases with the distance from the melt 12. The last perforated screen 47 immediately before the diffraction grating 42 has the annular slits with the largest diameter. The distribution of the annular apertures 54 on the perforated screens 43 to 47 and the relative position, i.e. the mutual distances between the perforated screens 43 to 47 are such that the annular apertures 54 of different perforated screens 43 to 47 are aligned, "cone surface passages" 60 of a thickness determined by the width of the slit-shaped annular apertures 54 being formed, which transmit the light coming from the melt 12 to the diffraction grating 42. All cone surface passages 60 are directed onto the same (observation) point 62 on the surface of the melt 12. Thus, the package of perforated screens lets the light of the observation point 62 pass through to the diffraction grating 42 at a comparatively large solid angle.

The shielding screen 48 behind the diffraction grating 42 is impermeable to light in the shield areas 64 lying in the projection of the passages 60. These shield areas 64 intercept vapor particles flying through the passages 60 so that these will not cause an evaporation of the window 15.

Figure 9B:
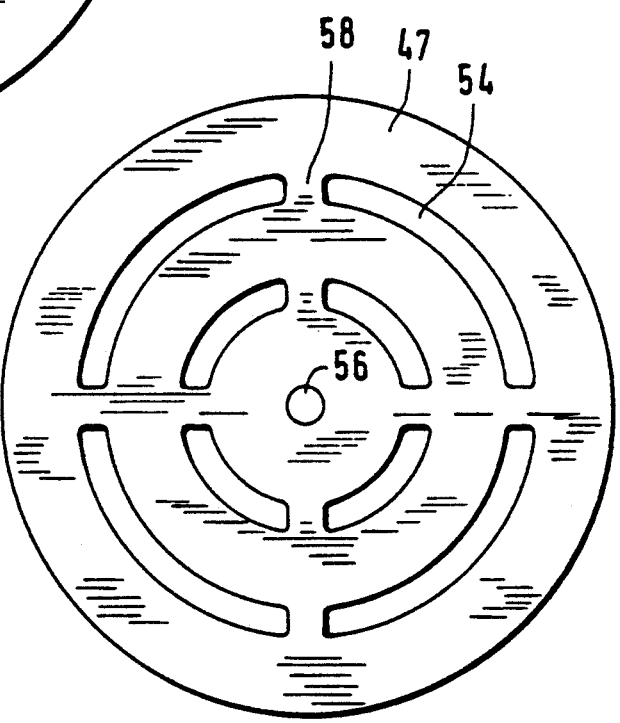
Figure 9C:
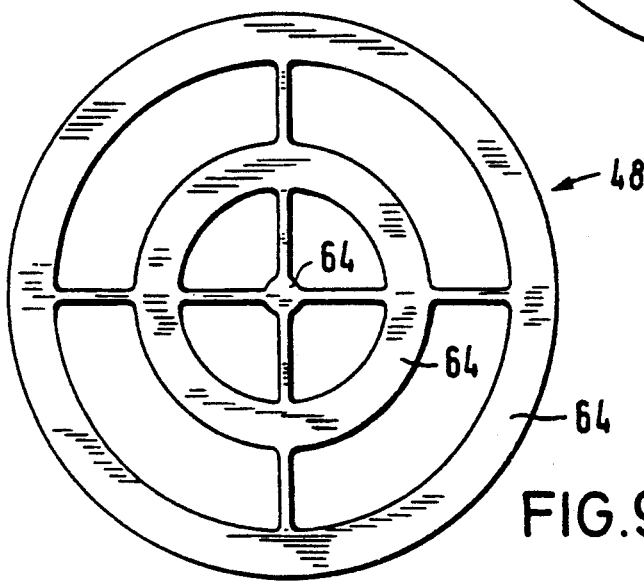

It should be noted that the illustration of the screens in the FIGS. 9 is simplified. In practice, each perforated screen would have considerably more annular apertures of a substantially lesser width than illustrated. Accordingly, there are considerably more opaque annular portions of the shielding screen 48.

It is the purpose of the diffraction grating 42 to transmit a maximum part of the conically impinging light through the passage openings of the shielding screen 48, located between the opaque shield areas 64, to the pyrometer 14 or the window 15. The optic of the pyrometer 14 reproduces the plane of the diffraction grating on the light detectors (not illustrated) so that the entire light passing the diffraction grating 42 is used for measuring the temperature. The diffraction grating 42 consists of a thin material with a plurality of small openings and thin ridges between these openings, transmission factors of 44 to 80% (59 lines/mm to 30 lines/mm) being obtained. In particular, the openings may be arranged translation-symmetrically.

The evaporation protective unit 68 consisting of the pin-hole screens 43 to 47, the diffraction grating 42 and the shielding screen 48, is cooled by the cooling jacket 52. Due to the cooling, one obtains a high condensation coefficient of particles which, therefore, cannot or only hardly fly to the window 15, but will condensate on their way to the same. The light reflections within the passages 60, which distort the temperature measuring, are avoided by blackening the pin-hole screens 43 to 47 or providing these with a light absorbing material, or by the fact that the passages 60, due to their being caused by the aligned annular apertures 54 of the perforated screens 43 to 47, do not have any walls at which light reflections could occur, except for the walls provided by the thickness of the perforated screens.

The perforated screens are supported at the retaining body 50 so as to be moved along the path of radiation. The displacement is performed by means of suitable drive elements not illustrated in FIGS. 8 to 11 for the sake of clarity. The entire package of perforated screens is displaced, the distance between adjacent screens changing by the same factor. The distance between the last perforated screen 47 and the shielding screen 48 also changes by this factor. As is schematically illustrated in FIG. 10, the distance between the evaporation protective unit 68 and the melt can be changed by shifting the package of perforated screens. In this way, it is possible to focus on the observation point on the melt surface.

Figure 11B:
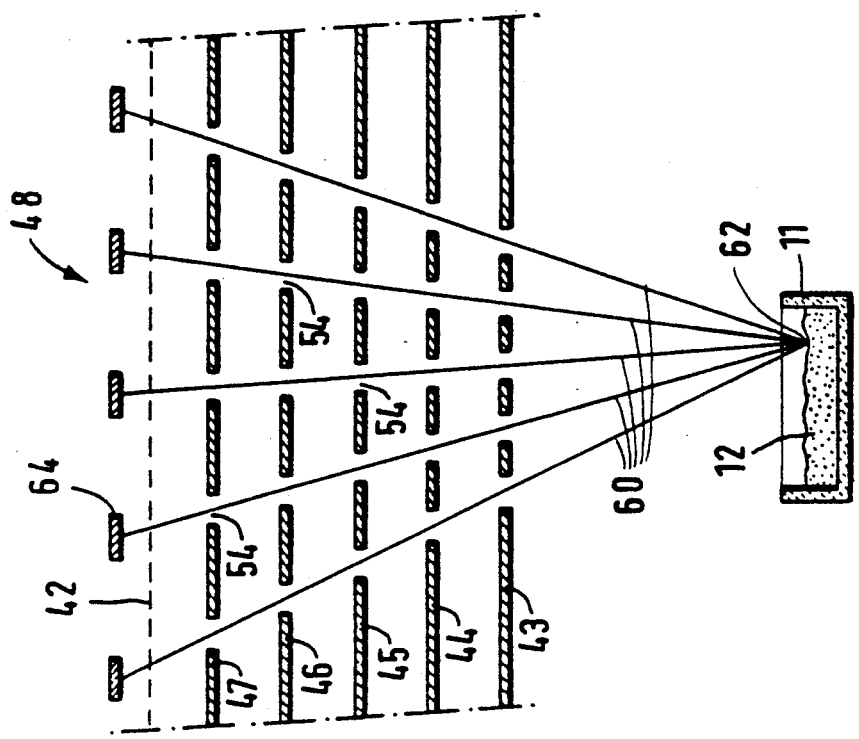
Figure 11A:
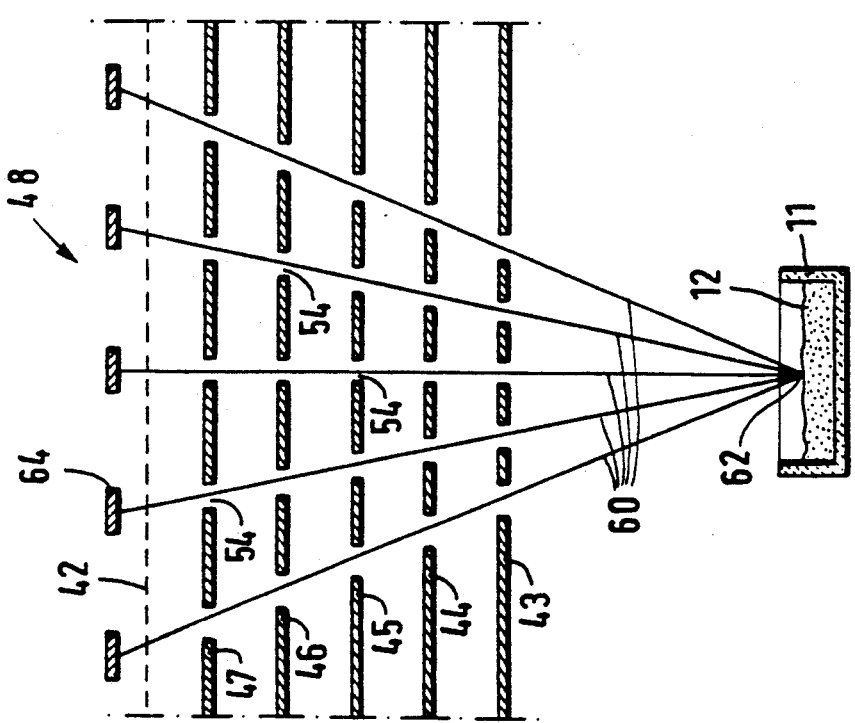

Whereas a (vertical) displacement of the observation point on the optical axis is effected by a relative displacement of the perforated screens along the optical axis, a relative parallel displacement of the perforated screens perpendicular to the optical axis will result in a displacement of the observation point perpendicular to the optical axis, i.e. along or parallel to the melt surface. FIG. 11 is a schematical illustration of this displaceability in the horizontal direction.

I claim:

1. A device for measuring the radiation temperature of a radiation generating melt in a vacuum, comprising:
   a pyrometer,
   a matter permeable grating, arranged substantially between the melt and the pyrometer, for concentrating the radiation from the melt onto the pyrometer and shielding the pyrometer from molecules of the melt, the grating defining a radial extension and comprising a zone plate having concentric rings, and
   a shielding screen arranged along the optical axis, the shielding screen defining a radial extension which is smaller than the radial extension of the grating,
   wherein the melt, the grating and the pyrometer are arranged along a substantially straight optical axis.

2. A device for measuring the radiation temperature of a radiation generating melt in a vacuum, comprising:
   a pyrometer, and
   a matter permeable optical diffraction grating arranged substantially between the melt and the pyrometer, the optical diffraction grating concentrating the radiation from the melt onto the pyrometer and shielding the pyrometer from molecules of the melt,
   wherein the melt and the optical diffraction grating define an optical axis, and
   wherein the optical diffraction grating deflects radiation from the optical axis toward the pyrometer.

3. The device according to claim 2, wherein the optical diffraction grating comprises a zone plate having a rings and wherein the rings define centers which are offset relative to one another and which lie along a common line.

4. The device according to claim 2, comprising a plurality of pyrometers, each of the plurality of pyrometers defining a different angle of diffraction relative to the optical diffraction grating.

5. A device for measuring the radiation temperature of a radiation generating melt in a vacuum, comprising:
   a pyrometer,
   a matter permeable optical diffraction grating arranged substantially between the melt and the pyrometer, and
   direction-selective means for collimating radiation arranged substantially between the melt and the optical diffraction grating, the direction-selective means comprising a plurality of tubes.

6. A device for measuring the radiation temperature of a radiation generating melt in a vacuum, comprising:
   a pyrometer,
   a matter permeable optical diffraction grating arranged substantially between the melt and the pyrometer, the optical diffraction grating comprising a reproductive diffraction grating, and
   direction-selective means for collimating radiation arranged substantially between the melt and the optical diffraction grating.

7. A device for measuring the radiation temperature of a radiation generating melt in a vacuum, comprising:
   a pyrometer, and
   a matter permeable optical diffraction grating, arranged substantially between the melt and the pyrometer, for concentrating the radiation from the melt onto the pyrometer and shielding the pyrometer from molecules of the melt, the optical diffraction grating defining a radial extension and comprising a zone plate having concentric rings,
   wherein the melt, the optical diffraction grating and the pyrometer are arranged along a substantially straight optical axis.

* * * * *